US011923921B2

(12) United States Patent
Raghavan et al.

(10) Patent No.: US 11,923,921 B2
(45) Date of Patent: Mar. 5, 2024

(54) TECHNIQUES FOR DYNAMIC BEAM CORRESPONDENCE FOR MITIGATION OF BLOCKAGE CONDITIONS

(71) Applicant: QUALCOMM Incorporated, San Diego, CA (US)

(72) Inventors: Vasanthan Raghavan, West Windsor Township, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/453,737

(22) Filed: Nov. 5, 2021

(65) Prior Publication Data

US 2023/0147917 A1    May 11, 2023

(51) Int. Cl.
| | |
|---|---|
| *H04B 7/02* | (2018.01) |
| *H01Q 3/28* | (2006.01) |
| *H04B 7/0417* | (2017.01) |
| *H04B 7/0426* | (2017.01) |
| *H04B 17/10* | (2015.01) |

(52) U.S. Cl.
CPC ............ *H04B 7/0417* (2013.01); *H01Q 3/28* (2013.01); *H04B 7/043* (2013.01); *H04B 17/104* (2015.01)

(58) Field of Classification Search
CPC .... H04B 7/0417; H04B 17/104; H04B 7/043; H01Q 3/28

USPC ....... 375/267, 262, 261, 260, 259, 219, 295, 375/316
See application file for complete search history.

(56) References Cited

U.S. PATENT DOCUMENTS

| | | | |
|---|---|---|---|
| 2021/0013939 A1 | 1/2021 | Liu et al. | |
| 2021/0028832 A1* | 1/2021 | Liu | H04W 16/28 |
| 2021/0050666 A1* | 2/2021 | Cirik | H04W 76/38 |
| 2021/0175919 A1 | 6/2021 | Badic et al. | |
| 2021/0234578 A1* | 7/2021 | Zander | H04B 7/10 |
| 2022/0393733 A1* | 12/2022 | Arumugam | H04B 7/0602 |

OTHER PUBLICATIONS

International Search Report and Written Opinion—PCT/US2022/077981—ISA/EPO—dated Jan. 18, 2023.

* cited by examiner

*Primary Examiner* — Zewdu A Kassa
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may determine a blockage condition associated with at least one antenna element of a plurality of antenna elements. The UE may deactivate a set of antenna elements of the plurality of antenna elements based at least in part on the determination of the blockage condition, wherein the set of antenna elements includes the at least one antenna element. The UE may transmit, based at least in part on deactivating the set of antenna elements, an indication of a beam correspondence state. The UE may communicate using an activated set of antenna elements of the plurality of antenna elements. Numerous other aspects are described.

30 Claims, 8 Drawing Sheets

TECHNIQUES FOR DYNAMIC BEAM CORRESPONDENCE FOR MITIGATION OF BLOCKAGE CONDITIONS

FIELD OF THE DISCLOSURE

Aspects of the present disclosure generally relate to wireless communication and to techniques and apparatuses for dynamic beam correspondence for mitigation of blockage conditions.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining a blockage condition associated with at least one antenna element of a plurality of antenna elements. The method may include deactivating a set of antenna elements of the plurality of antenna elements based at least in part on the determination of the blockage condition, wherein the set of antenna elements includes the at least one antenna element. The method may include transmitting, based at least in part on deactivating the set of antenna elements, an indication of a beam correspondence state. The method may include communicating using an activated set of antenna elements of the plurality of antenna elements.

Some aspects described herein relate to a method of wireless communication performed by a base station. The method may include receiving, based at least in part on a deactivated set of antenna elements of a plurality of antenna elements of a UE, an indication of a beam correspondence state. The method may include transmitting one or more reference signals to the UE to be used by the UE for beam training associated with an activated set of antenna elements of the plurality of antenna elements. The method may include receiving beam training feedback associated with the activated set of antenna elements.

Some aspects described herein relate to a UE for wireless communication. The UE may include a memory and one or more processors coupled to the memory. The one or more processors may be configured to determine a blockage condition associated with at least one antenna element of a plurality of antenna elements. The one or more processors may be configured to deactivate a set of antenna elements of the plurality of antenna elements based at least in part on the determination of the blockage condition, wherein the set of antenna elements includes the at least one antenna element. The one or more processors may be configured to transmit, based at least in part on deactivating the set of antenna elements, an indication of a beam correspondence state. The one or more processors may be configured to communicate using an activated set of antenna elements of the plurality of antenna elements.

Some aspects described herein relate to a base station for wireless communication. The base station may include a memory and one or more processors coupled to the memory. The one or more processors may be configured to receive, based at least in part on a deactivated set of antenna elements of a plurality of antenna elements of a UE, an indication of a beam correspondence state. The one or more processors may be configured to transmit one or more reference signals to the UE to be used by the UE for beam training associated with an activated set of antenna elements of the plurality of antenna elements. The one or more processors may be configured to receive beam training feedback associated with the activated set of antenna elements.

Some aspects described herein relate to a non-transitory computer-readable medium that stores a set of instructions for wireless communication by a UE. The set of instructions, when executed by one or more processors of the UE, may cause the UE to determine a blockage condition associated with at least one antenna element of a plurality of antenna elements. The set of instructions, when executed by one or more processors of the UE, may cause the UE to deactivate a set of antenna elements of the plurality of antenna elements based at least in part on the determination of the blockage condition, wherein the set of antenna elements includes the at least one antenna element. The set of instructions, when executed by one or more processors of the UE, may cause the UE to transmit, based at least in part on deactivating the set of antenna elements, an indication of a beam correspondence state. The set of instructions, when executed by one or more processors of the UE, may cause the UE to communicate using an activated set of antenna elements of the plurality of antenna elements.

Some aspects described herein relate to a non-transitory computer-readable medium that stores a set of instructions for wireless communication by a base station. The set of instructions, when executed by one or more processors of the base station, may cause the base station to receive, based at least in part on a deactivated set of antenna elements of a plurality of antenna elements of a UE, an indication of a beam correspondence state. The set of instructions, when executed by one or more processors of the base station, may cause the base station to transmit one or more reference signals to the UE to be used by the UE for beam training associated with an activated set of antenna elements of the plurality of antenna elements. The set of instructions, when executed by one or more processors of the base station, may cause the base station to receive beam training feedback associated with the activated set of antenna elements.

Some aspects described herein relate to an apparatus for wireless communication. The apparatus may include means for determining a blockage condition associated with at least one antenna element of a plurality of antenna elements. The apparatus may include means for deactivating a set of antenna elements of the plurality of antenna elements based at least in part on the determination of the blockage condition, wherein the set of antenna elements includes the at least one antenna element. The apparatus may include means for transmitting, based at least in part on deactivating the set of antenna elements, an indication of a beam correspondence state. The apparatus may include means for communicating using an activated set of antenna elements of the plurality of antenna elements.

Some aspects described herein relate to an apparatus for wireless communication. The apparatus may include means for receiving, based at least in part on a deactivated set of antenna elements of a plurality of antenna elements of a UE, an indication of a beam correspondence state. The apparatus may include means for transmitting one or more reference signals to the UE to be used by the UE for beam training associated with an activated set of antenna elements of the plurality of antenna elements. The apparatus may include means for receiving beam training feedback associated with the activated set of antenna elements.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
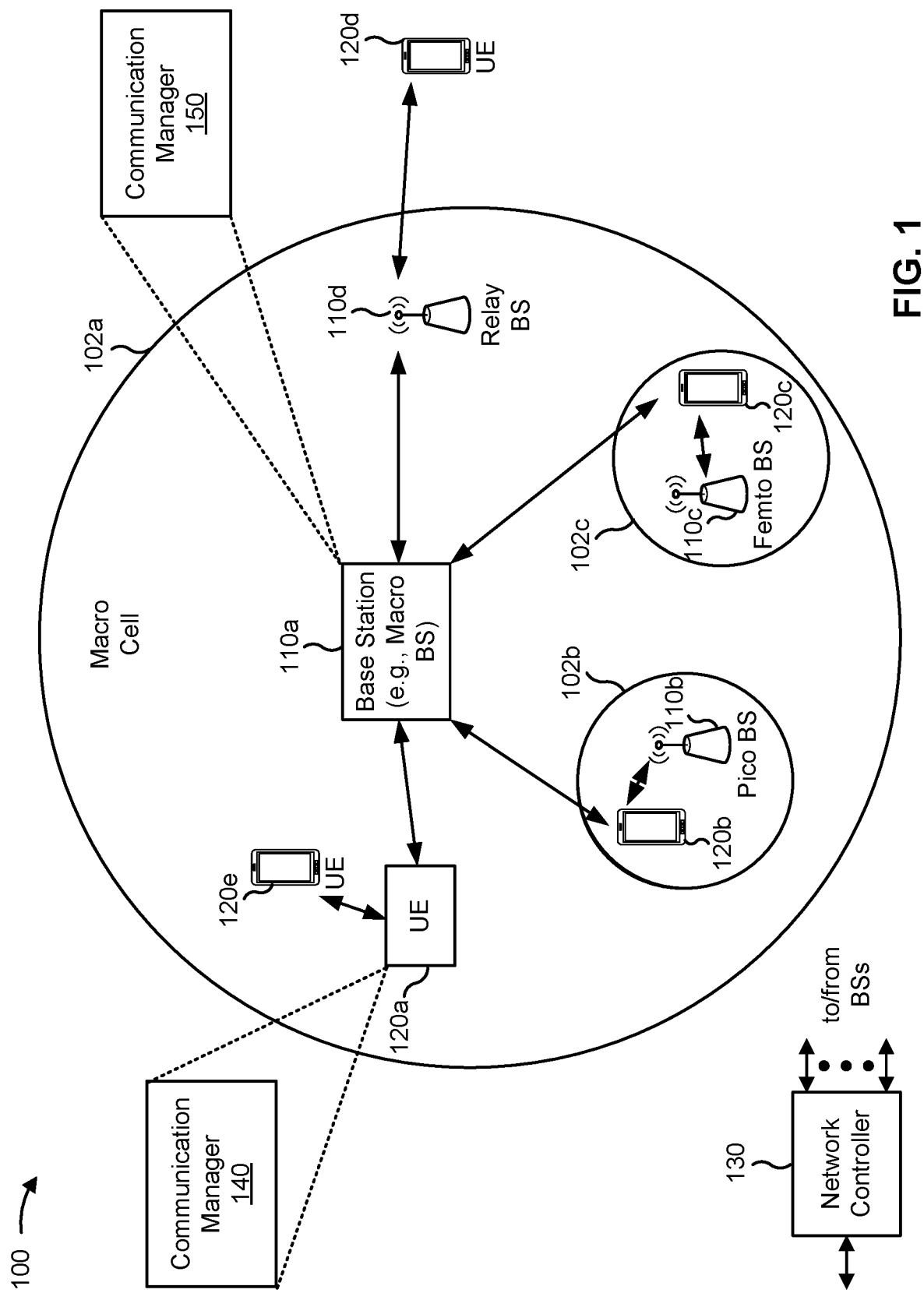
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine a blockage condition associated with at least one antenna element of a plurality of antenna elements; deactivate a set of antenna elements of the plurality of antenna elements based at least in part on the determination of the blockage condition, wherein the set of antenna elements includes the at least one antenna element; transmit, based at least in part on deactivating the set of antenna elements, an indication of a beam correspondence state; and communicate using an activated set of antenna elements of the plurality of antenna elements. Additionally, or alternatively, the communication manager 140 may perform one or more other operations described herein.

In some aspects, the base station 110 may include a communication manager 150. As described in more detail elsewhere herein, the communication manager 150 may receive, based at least in part on a deactivated set of antenna elements of a plurality of antenna elements of a UE, an indication of a beam correspondence state; transmit one or more reference signals to the UE to be used by the UE for beam training associated with an activated set of antenna elements of the plurality of antenna elements; and receive beam training feedback associated with the activated set of antenna elements. Additionally, or alternatively, the communication manager 150 may perform one or more other operations described herein.

As indicated above, FIG. 1 is provided as an example. Other examples may differ from what is described with regard to FIG. 1.

Figure 2:
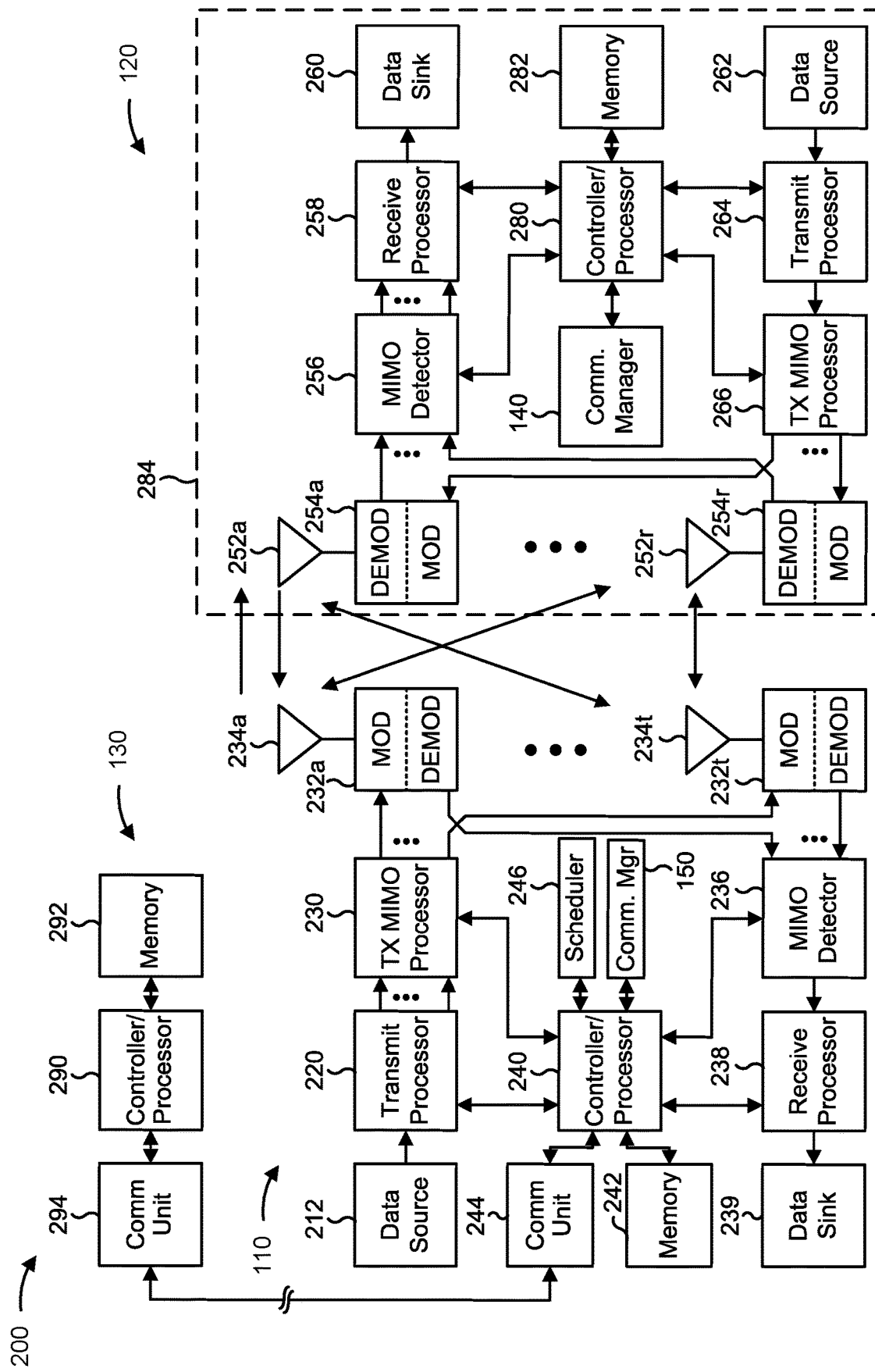
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with dynamic beam management, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for determining a blockage condition associated with at least one antenna element of a plurality of antenna elements; means for deactivating a set of antenna elements of the plurality of antenna elements based at least in part on the determination of the blockage condition, wherein the set of antenna elements includes the at least one antenna element; means for transmitting, based at least in part on deactivating the set of antenna elements, an indication of a beam correspondence state; and/or means for communicating using an activated set of antenna elements of the plurality of antenna elements. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, based at least in part on a deactivated set of antenna elements of a plurality of antenna elements of a UE, an indication of a beam correspondence state; means for transmitting one or more reference signals to the UE to be used by the UE for beam training associated with an activated set of antenna elements of the plurality of antenna elements; and/or means for receiving beam training feedback associated with the activated set of antenna elements. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
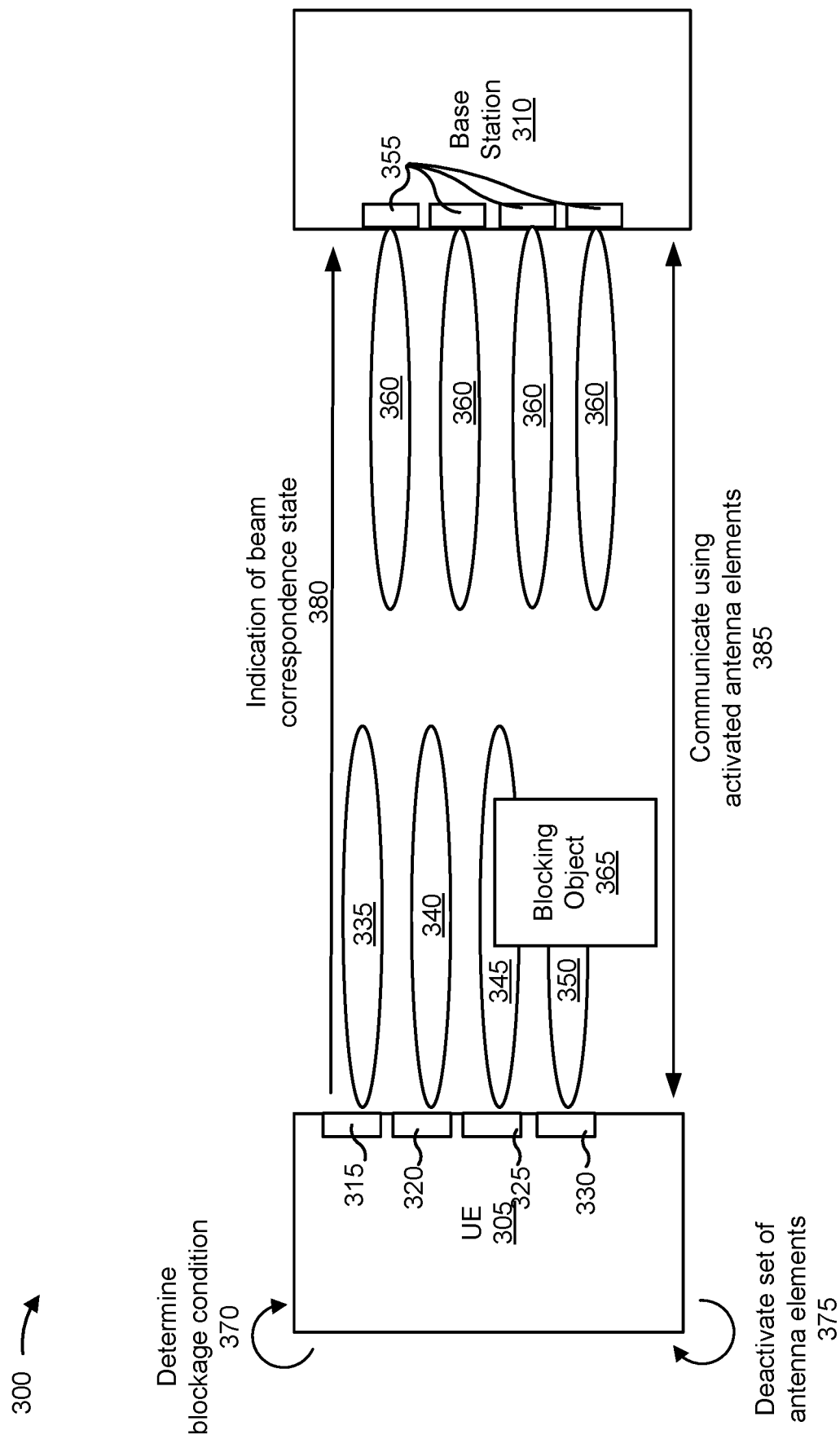
FIG. 3 is a diagram illustrating an example of a beam blockage condition, in accordance with the present disclosure.

FIG. 3 is a diagram illustrating an example 300 of a beam blockage condition, in accordance with the present disclosure.

As shown in FIG. 3, a UE 305 and a base station 310 may communicate with one another. In some aspects, for example, the UE 305 may include a plurality of antenna elements 315, 320, 325, and 330 configured to transmit and/or receive millimeter waves using one or more beams 335, 340, 345, or 350, which may include an uplink beam, a downlink beam, and/or a beam pair. Similarly, the base station 310 may include a plurality of antenna elements 355 configured to transmit and/or receive millimeter waves using one or more beams 360.

The UE 305 and/or the base station 310 may use beamforming across one or more of their respective pluralities of antennas 315, 320, 325, 330, and 355. In some aspects, for example, codebook-based and/or directional beamforming may be used. As further shown, a beam 345 and/or a beam 350 may become at least partially blocked, such as when an obstruction (shown as "blocking object" 365) interrupts a propagation path of the beam 345 and/or the beam 350. In example 300, the blocking object 365 is shown as partially blocking the path of the beam 345 and completely blocking the path of the beam 350. In some aspects, for example, the blocking object 365 may be a user's hand, a part of a user's car, a user's body, a building, and/or a nearby person or other object, among other examples.

Beam blocking may result in an abrupt decrease (e.g., below a threshold, such as a noise floor) in the useful signal strength received for the beam 345, the beam 350, and/or one or more adjacent beams 335 and/or 340 in a beam set that includes the beams 345 and 350. This degradation in signal strength may occur across the entire system bandwidth on those beams (e.g., rather than being isolated to one or more frequencies) for a duration of time. This may result in communication errors, such as dropped communications, failed reception, failed demodulation, and/or failed decoding.

In some cases, for example, the presence of a hand or fingers near the antenna element(s) 325 and/or 330 in an antenna module can lead to random phase perturbations observed at the antenna elements 325 and/or 330 over existing freespace phase relationships. The presence of a hand can also introduce amplitude perturbations (depending on angle of interest). These perturbations can change with antenna elements depending on hand grip, hand orientation, skin properties, and/or the anatomy of user, among other examples. To mitigate beam blockage conditions, such as blockage due to hand and/or fingers, adaptive beam weights may be used by a UE. The adaptive beam weights may be used for downlink reception and/or uplink transmission. The adaptive beam weights may be used to adaptively determine amplitudes and/or phases based on a number of factors including hand grip and/or orientation, user and/or skin properties, and/or angle of interest, among other examples.

In general, this approach can lead to loss in beam correspondence between downlink and uplink since the adaptive beam weights may not be power density-characterized (e.g., to meet maximum permissible exposure (MPE) regulations). For example, the number of possible beam weights may be significantly large enough to disallow power density characterization in factory calibration over a finite time period of commercialization. In some cases, for example, the number of possible beams can scale as $(2^{Bphase})^{N-1} * (2^{Bamp})^N$ where N=array size in number of antenna elements, $B_{phase}$=phase shifter granularity, and $B_{amp}$=amplitude control precision. For example, in the case of the UE 305, which has four antenna elements, N=4, and with example granularities of $B_{phase}=B_{amp}=3$, there are $(8)^7=2.09$ million possible beam weights. Every one of these beam weights would need to be power density-characterized to meet MPE regulations (e.g., imposed by the Federal Communications Commission and/or the International Commission on Non-Ionizing Radiation Protection, among other examples of regulatory bodies) for use on the uplink (to meet beam correspondence). This can be a difficult, if not impossible, task for even moderate values of N, $B_{phase}$, and $B_{amp}$.

Some aspects of the techniques and apparatuses described herein facilitate turning some antenna elements completely off based on what is sensed or observed in terms of blockage characteristics. For example, in some aspects, as shown by reference number 370, the UE 305 may determine a blockage condition associated with at least one antenna element of a plurality of antenna elements. As shown by reference number 375, the UE 305 may deactivate a set of antenna elements based on the determination of the blockage condition, and, as shown by reference number 380, the UE 305 may transmit an indication of a beam correspondence state based at least in part on deactivating the set of antenna elements. As shown by reference number 385, the UE 305 may communicate using an activated set of antenna elements. In this way, some aspects may facilitate using adaptive beam weights associated with a subset of an array of antenna elements, thereby reducing the need to perform a prohibitive number of power density characterizations. As a result, some aspects may allow realization of the power gains that can be achieved using adaptive beam weights, thereby having a positive impact on network performance in the presence of beam blockage conditions.

As indicated above, FIG. 3 is provided merely as an example. Other examples may differ from what is described with regard to FIG. 3.

Figure 4:
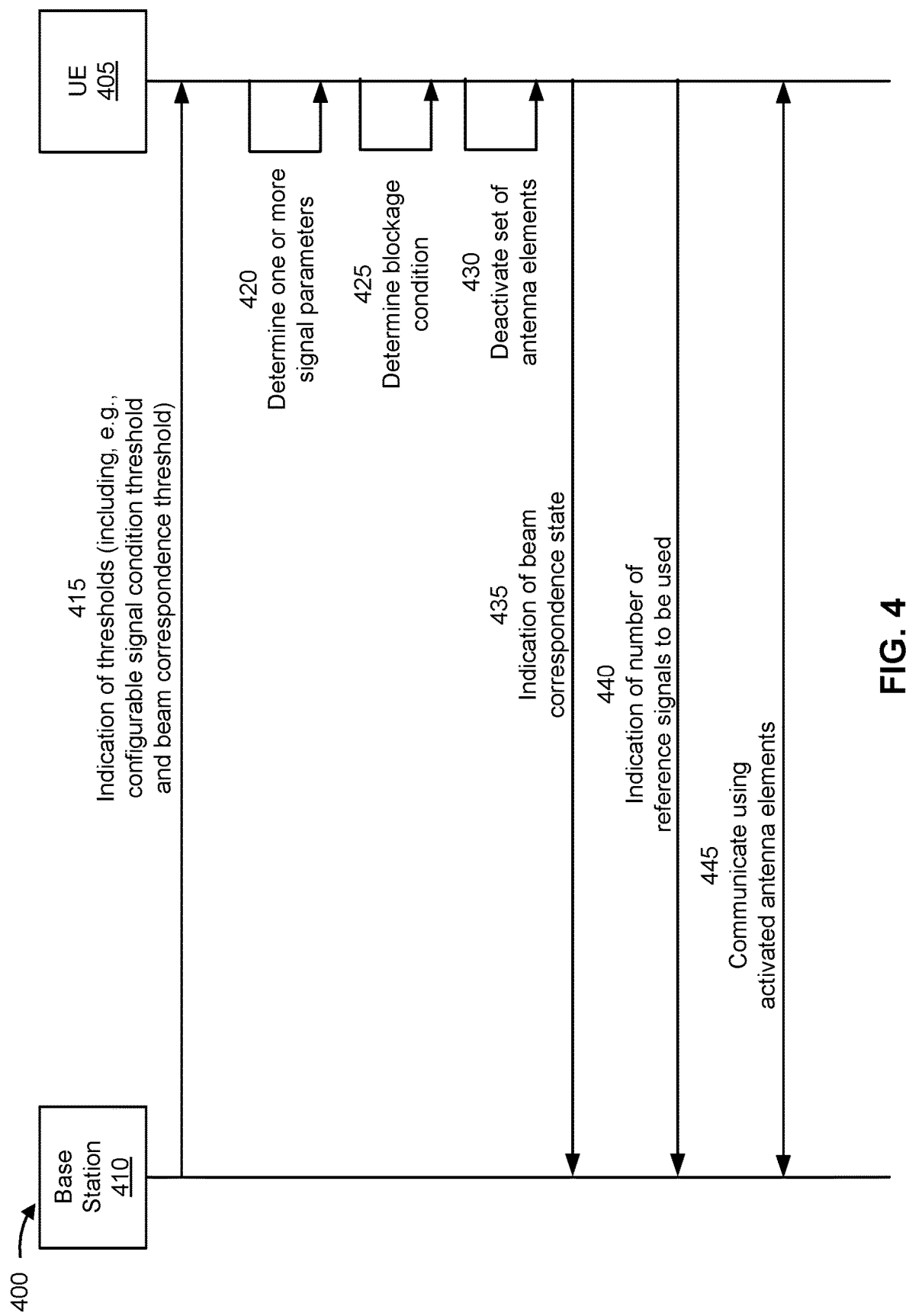
FIG. 4 is a diagram illustrating an example associated with dynamic beam management, in accordance with the present disclosure.

FIG. 4 is a diagram illustrating an example 400 associated with dynamic beam management, in accordance with the present disclosure. As shown in FIG. 4, a UE 405 and a base station 410 may communicate with one another. In some aspects, the UE 405 may be, or be similar to, the UE 305 shown in FIG. 3. In some aspects, the base station 410 may be, or be similar to, the base station 310 shown in FIG. 3.

As shown by reference number 415, the base station 410 may transmit, and the UE 405 may receive, one or more indications of one or more thresholds to be used to facilitate one or more other aspects of the techniques described herein. For example, in some aspects, the one or more indications may indicate a configurable signal condition threshold and/or a beam correspondence threshold, among other examples.

As shown by reference number 420, the UE 405 may determine one or more signal parameters and, as shown by reference number 425, the UE 405 may determine a blockage condition. For example, in some aspects, the UE 405 may determine the blockage condition associated with at least one antenna element of a plurality of antenna elements based at least in part on the one or more signal parameters. In some aspects, the UE 405 may determine the blockage condition associated with the at least one antenna element based at least in part on determining that one or more signal parameters associated with the at least one antenna element satisfy a signal condition.

For example, in some aspects, the UE 405 may determine a set of signal gain measurements associated with respective antenna elements of the plurality of antenna elements, and may determine that the one or more signal parameters satisfy the signal condition based at least in part on the determination of the set of signal gain measurements. In some aspects, the UE 405 may determine that the one or more signal parameters satisfy the signal condition based at least in part on comparing at least one signal measurement to a configurable signal condition threshold. As indicated above, the base station 410 may transmit an indication of the configurable signal condition threshold. The UE 405 may determine the configurable signal threshold by receiving the indication of the configurable signal condition threshold. In some aspects, the UE 405 may determine the configurable signal threshold based at least in part on one or more characteristics of the UE 405, an environment of the UE 405, one or more antenna elements of the UE 405, and/or a combination thereof.

As shown by reference number 430, the UE 405 may deactivate a set of antenna elements, of the plurality of antenna elements, based at least in part on the determination of the blockage condition. The set of antenna elements may include the at least one antenna element that was determined to be experiencing the blockage condition. As shown by reference number 435, the UE 405 may transmit, based at least in part on deactivating the set of antenna elements, and the base station 410 may receive, an indication of a beam correspondence state.

The UE 405 may determine the beam correspondence state based at least in part on the deactivated set of antenna elements and/or an activated set of antenna elements. For example, in some aspects, the UE 405 may determine that a count of deactivated antenna elements of the set of antenna elements satisfies a beam correspondence threshold, and may determine the beam correspondence state based at least in part on the determination that the count of deactivated antenna elements satisfies the beam correspondence threshold. In some aspects, the UE 405 may determine the beam correspondence threshold. As indicated above, the UE 405 may receive an indication of the beam correspondence threshold. In some aspects, the UE 405 may determine the beam correspondence threshold based at least in part on one or more characteristics of the UE 405, an environment of the UE 405, one or more antenna elements of the UE 405, and/or a combination thereof.

As shown by reference number 440, the UE 405 may transmit, and the base station 410 may receive, an indication of a number of reference signals to be used for at least one of beam training, beam refinement, or beam failure recovery. In some aspects, for example, the UE 405 may transmit the indication based at least in part on deactivating the set of antenna elements. In some aspects, the UE 405 may transmit the indication of the number of reference signals to be used for at least one of beam training, beam refinement, or beam failure recovery based at least in part on the determination of the blockage condition. In some aspects, the UE 405 may determine the number of reference signals to be used for at least one of beam training, beam refinement, or beam failure recovery based at least in part on a function of at least one of a count of deactivated antenna elements of the set of antenna elements or a characteristic associated with the signal condition.

As shown by reference number 445, the UE 405 and the base station 410 may communicate using an activated set of antenna elements of the plurality of antenna elements. In some aspects, for example, the UE 405 may communicate using the activated set of antenna elements based at least in part on transmitting a communication using an equal power level for each antenna element of the activated set of antenna elements. In some aspects, the equal power level may include a maximum power level corresponding to a saturated power of a linear region of a performance characteristic of a power amplifier of a plurality of power amplifiers. Each of the plurality of power amplifiers may be independently used with an antenna element of the activated set of antenna elements. In some aspects, the UE 405 may control at least one of a signal amplitude or a signal phase using the set of activated antenna elements. For example, the UE 405 may control the at least one of the signal amplitude or the signal phase to mitigate the blockage condition.

As indicated above, FIG. 4 is provided as an example. Other examples may differ from what is described with respect to FIG. 4.

Figure 5:
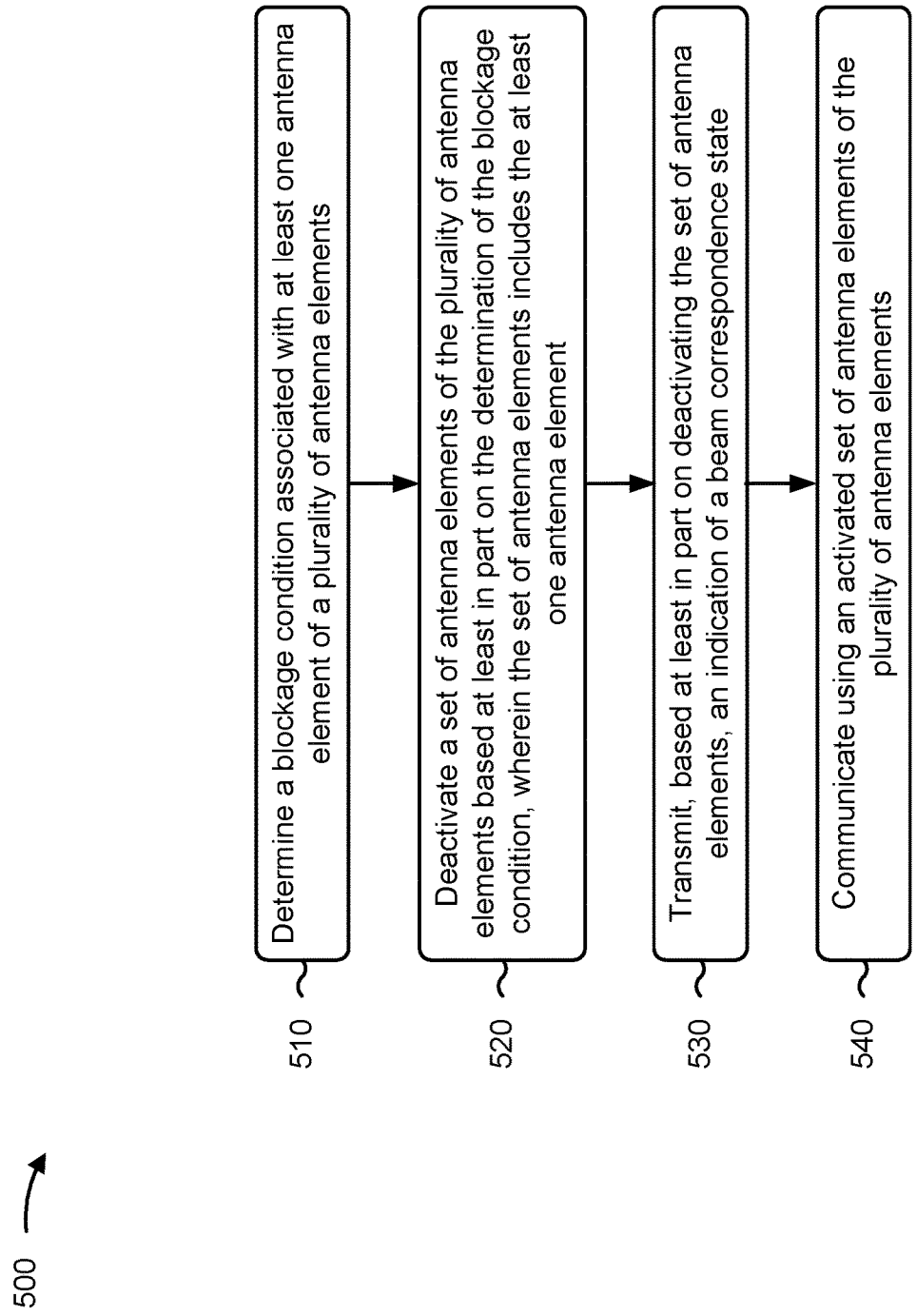
FIGS. 5 and 6 are diagrams illustrating example processes associated with dynamic beam management, in accordance with the present disclosure.

FIG. 5 is a diagram illustrating an example process 500 performed, for example, by a UE, in accordance with the present disclosure. Example process 500 is an example where the UE (e.g., UE 405) performs operations associated with techniques for dynamic beam management.

As shown in FIG. 5, in some aspects, process 500 may include determining a blockage condition associated with at least one antenna element of a plurality of antenna elements (block 510). For example, the UE (e.g., using communication manager 140 and/or determination component 708, depicted in FIG. 7) may determine a blockage condition associated with at least one antenna element of a plurality of antenna elements, as described above.

As further shown in FIG. 5, in some aspects, process 500 may include deactivating a set of antenna elements of the plurality of antenna elements based at least in part on the determination of the blockage condition, wherein the set of antenna elements includes the at least one antenna element (block 520). For example, the UE (e.g., using communication manager 140 and/or deactivation component 710, depicted in FIG. 7) may deactivate a set of antenna elements of the plurality of antenna elements based at least in part on the determination of the blockage condition, wherein the set of antenna elements includes the at least one antenna element, as described above.

As further shown in FIG. 5, in some aspects, process 500 may include transmitting, based at least in part on deactivating the set of antenna elements, an indication of a beam correspondence state (block 530). For example, the UE (e.g., using communication manager 140 and/or transmission component 704, depicted in FIG. 7) may transmit, based at least in part on deactivating the set of antenna elements, an indication of a beam correspondence state, as described above.

As further shown in FIG. 5, in some aspects, process 500 may include communicating using an activated set of antenna elements of the plurality of antenna elements (block 540). For example, the UE (e.g., using communication manager 140, reception component 702, and/or transmission component 704, depicted in FIG. 7) may communicate using an activated set of antenna elements of the plurality of antenna elements, as described above.

Process 500 may include additional aspects, such as any single aspect or any combination of aspects described below and/or in connection with one or more other processes described elsewhere herein.

In a first aspect, determining the blockage condition associated with the at least one antenna element comprises determining that one or more signal parameters associated with the at least one antenna element satisfy a signal condition.

In a second aspect, alone or in combination with the first aspect, process 500 includes determining a set of signal gain measurements associated with respective antenna elements of the plurality of antenna elements, and determining that the one or more signal parameters satisfy the signal condition based at least in part on the determination of the set of signal gain measurements.

In a third aspect, alone or in combination with one or more of the first and second aspects, determining that the one or more signal parameters satisfy the signal condition comprises comparing at least one signal measurement to a configurable signal condition threshold. In a fourth aspect, alone or in combination with the third aspect, process 500 includes determining the configurable signal condition threshold. In a fifth aspect, alone or in combination with the fourth aspect, determining the configurable signal condition threshold comprises receiving an indication of the configurable signal condition threshold.

In a sixth aspect, alone or in combination with one or more of the first through fifth aspects, communicating using the activated set of antenna elements comprises transmitting a communication using an equal power level for each antenna element of the activated set of antenna elements. In a seventh aspect, alone or in combination with the sixth aspect, the equal power level comprises a maximum power level corresponding to a saturated power of a linear region of a performance characteristic of a power amplifier of a plurality of power amplifiers, wherein each of the plurality of power amplifiers may be independently used with an antenna element of the activated set of antenna elements.

In an eighth aspect, alone or in combination with one or more of the first through seventh aspects, process 500 includes controlling at least one of a signal amplitude or a signal phase using the set of activated antenna elements. In a ninth aspect, alone or in combination with the eighth aspect, controlling the at least one of the signal amplitude or the signal phase comprises controlling the at least one of the signal amplitude or the signal phase to mitigate the blockage condition. In a tenth aspect, alone or in combination with the ninth aspect, process 500 includes determining that a count of deactivated antenna elements of the set of antenna elements satisfies a beam correspondence threshold, and determining the beam correspondence state based at least in part on the determination that the count of deactivated antenna elements satisfies the beam correspondence threshold. In an eleventh aspect, alone or in combination with the tenth aspect, process 500 includes determining the beam correspondence threshold. In a twelfth aspect, alone or in combination with the eleventh aspect, determining the beam correspondence threshold comprises receiving an indication of the beam correspondence threshold.

In a thirteenth aspect, alone or in combination with one or more of the first through twelfth aspects, process 500 includes transmitting, based at least in part on deactivating the set of antenna elements, an indication of a number of reference signals to be used for at least one of beam training, beam refinement, or beam failure recovery. In a fourteenth aspect, alone or in combination with the thirteenth aspect, transmitting the indication of the number of reference signals to be used for at least one of beam training, beam refinement, or beam failure recovery comprises transmitting the indication of the number of reference signals based at least in part on the determination of the blockage condition. In a fifteenth aspect, alone or in combination with the fourteenth aspect, process 500 includes determining the number of reference signals to be used for at least one of beam training, beam refinement, or beam failure recovery based at least in part on a function of at least one of a count of deactivated antenna elements of the set of antenna elements, or a characteristic associated with the signal condition.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
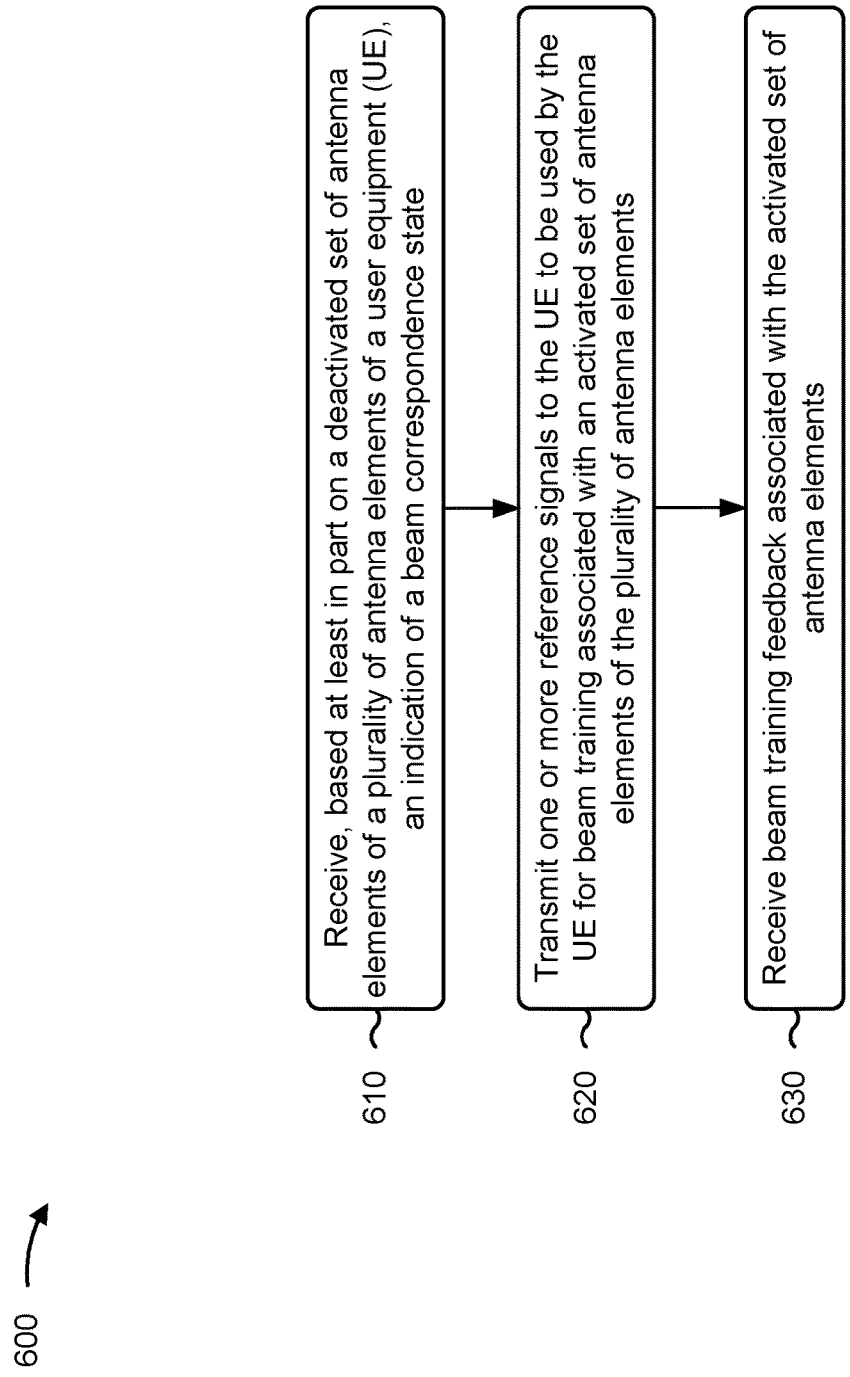

FIG. 6 is a diagram illustrating an example process 600 performed, for example, by a base station, in accordance with the present disclosure. Example process 600 is an example where the base station (e.g., base station 410) performs operations associated with techniques for dynamic beam management.

As shown in FIG. 6, in some aspects, process 600 may include receiving, based at least in part on a deactivated set of antenna elements of a plurality of antenna elements of a UE, an indication of a beam correspondence state (block 610). For example, the base station (e.g., using communication manager 150 and/or reception component 802, depicted in FIG. 8) may receive, based at least in part on a deactivated set of antenna elements of a plurality of antenna elements of a UE, an indication of a beam correspondence state, as described above.

As further shown in FIG. 6, in some aspects, process 600 may include transmitting one or more reference signals to the UE to be used by the UE for beam training associated with an activated set of antenna elements of the plurality of antenna elements (block 620). For example, the base station (e.g., using communication manager 150 and/or transmission component 804, depicted in FIG. 8) may transmit one or more reference signals to the UE to be used by the UE for beam training associated with an activated set of antenna elements of the plurality of antenna elements, as described above.

As further shown in FIG. 6, in some aspects, process 600 may include receiving beam training feedback associated with the activated set of antenna elements (block 630). For example, the base station (e.g., using communication manager 150 and/or reception component 802, depicted in FIG. 8) may receive beam training feedback associated with the activated set of antenna elements, as described above.

Process 600 may include additional aspects, such as any single aspect or any combination of aspects described below and/or in connection with one or more other processes described elsewhere herein.

In a first aspect, process 600 includes transmitting an indication of a configurable signal condition threshold to be used by the UE to determine that one or more signal parameters associated with at least one antenna element of the plurality of antenna elements satisfy a signal condition.

In a second aspect, alone or in combination with the first aspect, process 600 includes receiving a communication associated with the activated set of antenna elements, wherein receiving the communication comprises receiving the communication at an equal power level or a maximum power level corresponding to a saturated power of a linear region of a performance characteristic of a power amplifier of a plurality of power amplifiers, wherein each of the plurality of power amplifiers is independently used with an antenna element of the activated set of antenna elements. In a third aspect, alone or in combination with the second aspect, process 600 includes transmitting a beam correspondence threshold to be used by the UE to determine the beam correspondence state.

In a fourth aspect, alone or in combination with one or more of the first through third aspects, process 600 includes receiving, based at least in part on the deactivated set of antenna elements, an indication of a number of reference signals to be used for at least one of beam training, beam refinement, or beam failure recovery, wherein transmitting the one or more reference signals comprises transmitting the one or more reference signals based at least in part on the indication of the number of reference signals. In a fifth aspect, alone or in combination with the fourth aspect, the number of reference signals to be used for at least one of beam training, beam refinement, or beam failure recovery is based at least in part on a function of at least one of a count of deactivated antenna elements of the deactivated set of antenna elements, or a characteristic associated with a signal condition.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
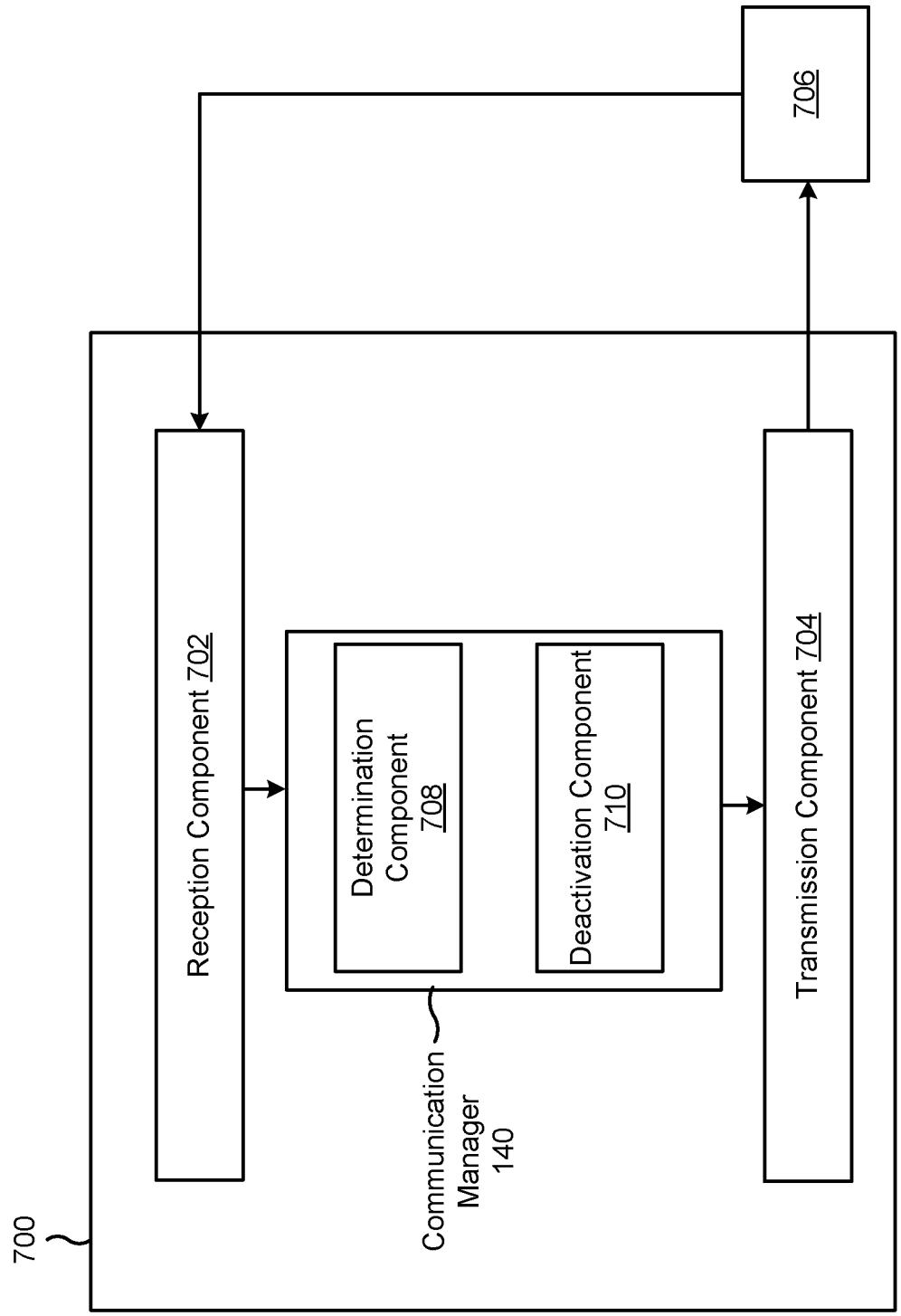
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a determination component 708 or a deactivation component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The communication manager 140 and/or the determination component 708 may determine a blockage condition associated with at least one antenna element of a plurality of antenna elements. The communication manager 140 and/or deactivation component 710 may deactivate a set of antenna elements of the plurality of antenna elements based at least in part on the determination of the blockage condition, wherein the set of antenna elements includes the at least one antenna element. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 702 and/or the transmission component 704. In some aspects, the determination component 708 may include one or more antennas, a modem, a modulator, a transmit MIMO processor, a transmit processor, a controller/processor, a memory, or a combination thereof, of the UE described in connection with FIG. 2. In some aspects, the determination component 708 may include the reception component 702 and/or the transmission component 704. In some aspects, the deactivation component 710 may include one or more antennas, a modem, a modulator, a transmit MIMO processor, a transmit processor, a controller/processor, a memory, or a combination thereof, of the UE described in connection with FIG. 2. In some aspects, the deactivation component 710 may include the reception component 702 and/or the transmission component 704.

The transmission component 704 may transmit, based at least in part on deactivating the set of antenna elements, an indication of a beam correspondence state. The communication manager 140, the reception component 702, and/or the transmission component 704, may communicate using an activated set of antenna elements of the plurality of antenna elements.

The determination component 708 may determine a set of signal gain measurements associated with respective antenna elements of the plurality of antenna elements. The determination component 708 may determine that the one or more signal parameters satisfy the signal condition based at least in part on the determination of the set of signal gain measurements. The determination component 708 may determine the configurable signal condition threshold. The communication manager 140, the reception component 702, and/or the transmission component 704, may control at least one of a signal amplitude or a signal phase using the set of activated antenna elements.

The determination component 708 may determine that a count of deactivated antenna elements of the set of antenna elements satisfies a beam correspondence threshold. The determination component 708 may determine the beam correspondence state based at least in part on the determination that the count of deactivated antenna elements satisfies the beam correspondence threshold. The determination component 708 may determine the beam correspondence threshold.

The transmission component 704 may transmit, based at least in part on deactivating the set of antenna elements, an indication of a number of reference signals to be used for at least one of beam training, beam refinement, or beam failure recovery. The determination component 708 may determine the number of reference signals to be used for at least one of beam training, beam refinement, or beam failure recovery based at least in part on a function of at least one of a count of deactivated antenna elements of the set of antenna elements, or a characteristic associated with the signal condition.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
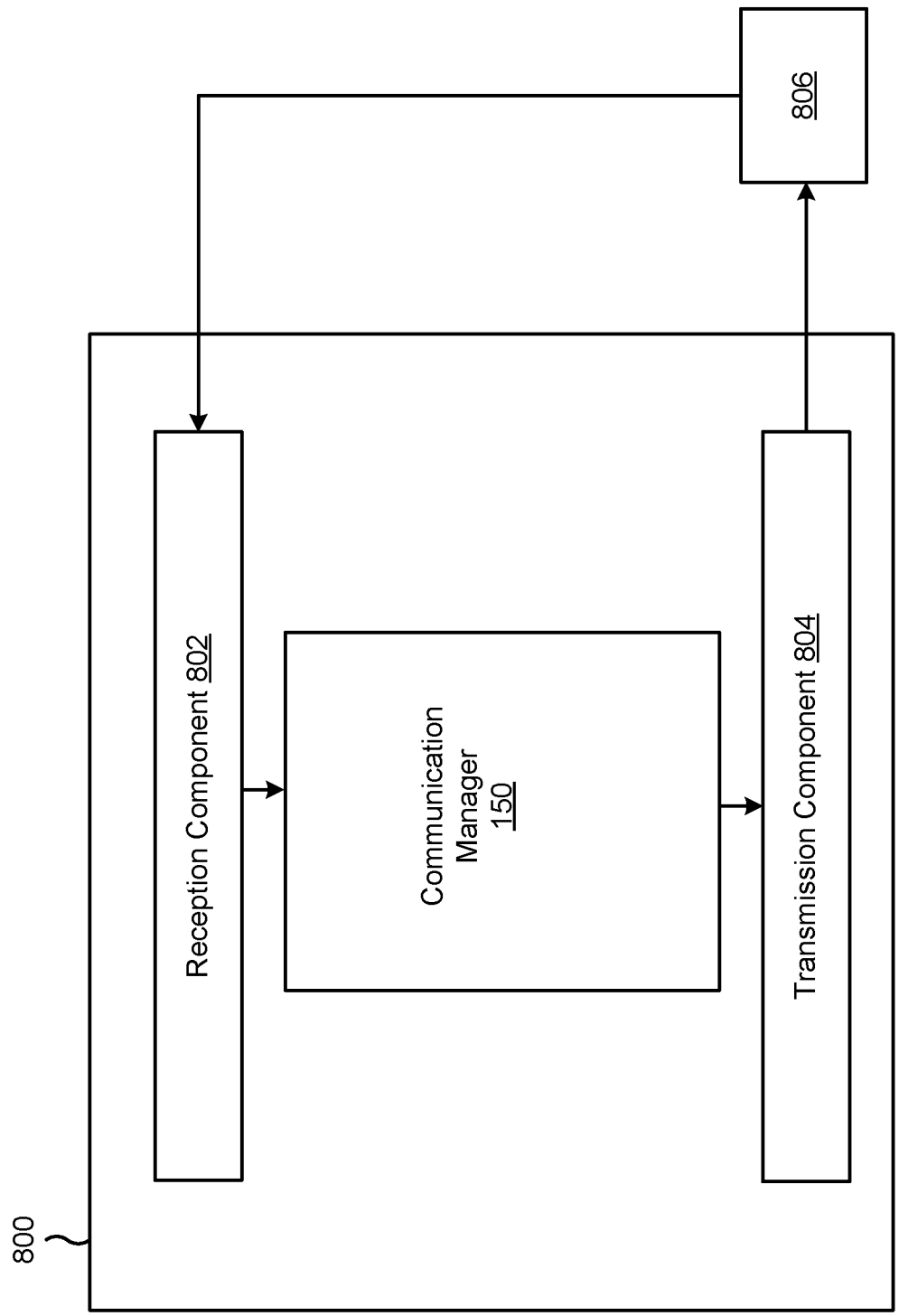

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The communication manager 150 may manage and/or control aspects of the operations of the reception component 802 and/or the transmission component 804. In some aspects, the communication manager 150 may include one or more antennas, a modem, a modulator, a transmit MIMO processor, a transmit processor, a controller/processor, a memory, or a combination thereof, of the base station described in connection with FIG. 2. In some aspects, the communication manager 150 may include the reception component 802 and/or the transmission component 804.

The reception component 802 may receive, based at least in part on a deactivated set of antenna elements of a plurality of antenna elements of a UE, an indication of a beam correspondence state. The transmission component 804 may transmit one or more reference signals to the UE to be used by the UE for at least one of beam training, beam refinement, or beam failure recovery associated with an activated set of antenna elements of the plurality of antenna elements. The reception component 802 may receive beam training feedback associated with the activated set of antenna elements.

The transmission component 804 may transmit an indication of a configurable signal condition threshold to be used by the UE to determine that one or more signal parameters associated with at least one antenna element of the plurality of antenna elements satisfy a signal condition. The transmission component 804 may transmit a beam correspondence threshold to be used by the UE to determine the beam correspondence state.

The reception component 802 may receive a communication associated with the activated set of antenna elements, wherein receiving the communication comprises receiving the communication at an equal power level or a maximum power level corresponding to a saturated power of a linear region of a performance characteristic of a power amplifier of a plurality of power amplifiers. Each of the plurality of power amplifiers may be independently used with an antenna element of the activated set of antenna elements. The reception component 802 may receive, based at least in part on the deactivated set of antenna elements, an indication of a number of reference signals to be used for at least one of beam training, beam refinement, or beam failure recovery, wherein transmitting the one or more reference signals comprises transmitting the one or more reference signals based at least in part on the indication of the number of reference signals.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: determining a blockage condition associated with at least one antenna element of a plurality of antenna elements; deactivating a set of antenna elements of the plurality of antenna elements based at least in part on the determination of the blockage condition, wherein the set of antenna elements includes the at least one antenna element; transmitting, based at least in part on deactivating the set of antenna elements, an indication of a beam correspondence state; and communicating using an activated set of antenna elements of the plurality of antenna elements.

Aspect 2: The method of Aspect 1, wherein determining the blockage condition associated with the at least one antenna element comprises determining that one or more signal parameters associated with the at least one antenna element satisfy a signal condition.

Aspect 3: The method of Aspect 2, further comprising: determining a set of signal gain measurements associated with respective antenna elements of the plurality of antenna elements; and determining that the one or more signal parameters satisfy the signal condition based at least in part on the determination of the set of signal gain measurements.

Aspect 4: The method of either of Aspects 2 or 3, wherein determining that the one or more signal parameters satisfy the signal condition comprises comparing at least one signal measurement to a configurable signal condition threshold.

Aspect 5: The method of Aspect 4, further comprising determining the configurable signal condition threshold.

Aspect 6: The method of Aspect 5, wherein determining the configurable signal condition threshold comprises receiving an indication of the configurable signal condition threshold.

Aspect 7: The method of any of Aspects 1-6, wherein communicating using the activated set of antenna elements comprises transmitting a communication using an equal power level for each antenna element of the activated set of antenna elements.

Aspect 8: The method of Aspect 7, wherein the equal power level comprises a maximum power level corresponding to a saturated power of a linear region of a performance characteristic of a power amplifier of a plurality of power amplifiers, wherein each of the plurality of power amplifiers is independently used with an antenna element of the activated set of antenna elements.

Aspect 9: The method of any of Aspects 1-8, further comprising controlling at least one of a signal amplitude or a signal phase using the set of activated antenna elements.

Aspect 10: The method of Aspect 9, wherein controlling the at least one of the signal amplitude or the signal phase comprises controlling the at least one of the signal amplitude or the signal phase to mitigate the blockage condition.

Aspect 11: The method of Aspect 10, further comprising: determining that a count of deactivated antenna elements of the set of antenna elements satisfies a beam correspondence threshold; and determining the beam correspondence state based at least in part on the determination that the count of deactivated antenna elements satisfies the beam correspondence threshold.

Aspect 12: The method of Aspect 11, further comprising determining the beam correspondence threshold.

Aspect 13: The method of Aspect 12, wherein determining the beam correspondence threshold comprises receiving an indication of the beam correspondence threshold.

Aspect 14: The method of any of Aspects 1-13, further comprising transmitting, based at least in part on deactivating the set of antenna elements, an indication of a number of reference signals to be used for at least one of beam training, beam refinement, or beam failure recovery.

Aspect 15: The method of Aspect 14, wherein transmitting the indication of the number of reference signals to be used for at least one of beam training, beam refinement, or beam failure recovery comprises transmitting the indication of the number of reference signals based at least in part on the determination of the blockage condition.

Aspect 16: The method of Aspect 15, further comprising determining the number of reference signals to be used for at least one of beam training, beam refinement, or beam failure recovery based at least in part on a function of at least one of: a count of deactivated antenna elements of the set of antenna elements, or a characteristic associated with the signal condition.

Aspect 17: A method of wireless communication performed by a base station, comprising: receiving, based at least in part on a deactivated set of antenna elements of a plurality of antenna elements of a user equipment (UE), an indication of a beam correspondence state; transmitting one or more reference signals to the UE to be used by the UE for beam training associated with an activated set of antenna elements of the plurality of antenna elements; and receiving beam training feedback associated with the activated set of antenna elements.

Aspect 18: The method of Aspect 17, further comprising transmitting an indication of a configurable signal condition threshold to be used by the UE to determine that one or more signal parameters associated with at least one antenna element of the plurality of antenna elements satisfy a signal condition.

Aspect 19: The method of either of Aspects 17 or 18, further comprising receiving a communication associated with the activated set of antenna elements, wherein receiving the communication comprises receiving the communication at an equal power level or a maximum power level corresponding to a saturated power of a linear region of a performance characteristic of a power amplifier of a plurality of power amplifiers, wherein each of the plurality of power amplifiers is independently used with an antenna element of the activated set of antenna elements.

Aspect 20: The method of Aspect 19, further comprising transmitting a beam correspondence threshold to be used by the UE to determine the beam correspondence state.

Aspect 21: The method of any of Aspects 17-20, further comprising receiving, based at least in part on the deactivated set of antenna elements, an indication of a number of reference signals to be used for at least one of beam training, beam refinement, or beam failure recovery, wherein transmitting the one or more reference signals comprises transmitting the one or more reference signals based at least in part on the indication of the number of reference signals.

Aspect 22: The method of Aspect 21, wherein the number of reference signals to be used for at least one of beam training, beam refinement, or beam failure recovery is based at least in part on a function of at least one of: a count of deactivated antenna elements of the deactivated set of antenna elements, or a characteristic associated with a signal condition.

Aspect 23: An apparatus for wireless communication at a device, comprising a processor; memory coupled with the processor; and instructions stored in the memory and executable by the processor to cause the apparatus to perform the method of one or more of Aspects 1-16.

Aspect 24: A device for wireless communication, comprising a memory and one or more processors coupled to the memory, the one or more processors configured to perform the method of one or more of Aspects 1-16.

Aspect 25: An apparatus for wireless communication, comprising at least one means for performing the method of one or more of Aspects 1-16.

Aspect 26: A non-transitory computer-readable medium storing code for wireless communication, the code comprising instructions executable by a processor to perform the method of one or more of Aspects 1-16.

Aspect 27: A non-transitory computer-readable medium storing a set of instructions for wireless communication, the set of instructions comprising one or more instructions that, when executed by one or more processors of a device, cause the device to perform the method of one or more of Aspects 1-16.

Aspect 28: An apparatus for wireless communication at a device, comprising a processor; memory coupled with the processor; and instructions stored in the memory and executable by the processor to cause the apparatus to perform the method of one or more of Aspects 17-22.

Aspect 29: A device for wireless communication, comprising a memory and one or more processors coupled to the memory, the one or more processors configured to perform the method of one or more of Aspects 17-22.

Aspect 30: An apparatus for wireless communication, comprising at least one means for performing the method of one or more of Aspects 17-22.

Aspect 31: A non-transitory computer-readable medium storing code for wireless communication, the code comprising instructions executable by a processor to perform the method of one or more of Aspects 17-22.

Aspect 32: A non-transitory computer-readable medium storing a set of instructions for wireless communication, the set of instructions comprising one or more instructions that, when executed by one or more processors of a device, cause the device to perform the method of one or more of Aspects 17-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   deactivating a set of antenna elements of a plurality of antenna elements based at least in part on a blockage condition associated with at least one antenna element of the plurality of antenna elements, wherein the set of antenna elements includes the at least one antenna element;
   identifying a signal phase associated with an activated set antenna elements of the plurality of antenna elements; and
   transmitting a communication based at least in part on the signal phase and using an equal power level for each antenna element of the activated set of antenna elements.

2. The method of claim 1, wherein a determination of the blockage condition of the at least one antenna element comprises determining that one or more signal parameters associated with the at least one antenna element satisfy a signal condition.

3. The method of claim 2, further comprising:
   determining a set of signal gain measurements associated with respective antenna elements of the plurality of antenna elements; and
   determining that the one or more signal parameters satisfy the signal condition based at least in part on the determination of the set of signal gain measurements.

4. The method of claim 2, wherein determining that the one or more signal parameters satisfy the signal condition comprises comparing at least one signal measurement to a configurable signal condition threshold.

5. The method of claim 4, further comprising determining the configurable signal condition threshold.

6. The method of claim 5, wherein determining the configurable signal condition threshold comprises receiving an indication of the configurable signal condition threshold.

7. The method of claim 1, wherein the equal power level comprises a maximum power level corresponding to a saturated power of a linear region of a performance characteristic of a power amplifier of a plurality of power amplifiers, wherein each power amplifier of the plurality of power amplifiers is independently used with an antenna element of the activated set of antenna elements.

8. The method of claim 1, wherein the signal phase is controlled to mitigate the blockage condition.

9. The method of claim 1, further comprising:
   determining that a count of deactivated antenna elements of the set of antenna elements satisfies a beam correspondence threshold; and
   determining a beam correspondence state based at least in part on the determination that the count of deactivated antenna elements satisfies the beam correspondence threshold.

10. The method of claim 9, further comprising determining the beam correspondence threshold.

11. The method of claim 10, wherein determining the beam correspondence threshold comprises receiving an indication of the beam correspondence threshold.

12. The method of claim 1, further comprising transmitting, based at least in part on deactivating the set of antenna elements, an indication of a number of reference signals to be used for at least one of beam training, beam refinement, or beam failure recovery.

13. The method of claim 12, wherein transmitting the indication of the number of reference signals to be used for at least one of beam training, beam refinement, or beam failure recovery comprises transmitting the indication of the number of reference signals based at least in part on a determination of the blockage condition.

14. The method of claim 13, further comprising determining the number of reference signals to be used for at least one of beam training, beam refinement, or beam failure recovery based at least in part on a function of at least one of:
   a count of deactivated antenna elements of the set of antenna elements, or
   a characteristic associated with a signal condition.

15. A method of wireless communication performed by a network entity, comprising:
   transmitting one or more reference signals to a user equipment (UE) to be used by the UE for beam training associated with an activated set of antenna elements of a plurality of antenna elements;
   receiving beam training feedback associated with the activated set of antenna elements; and
   receiving a communication at an equal power level for each antenna element of the activated set of antenna elements of the plurality of antenna elements, wherein a signal phase is based at least in part on the set of activated antenna elements.

16. The method of claim 15, further comprising transmitting an indication of a configurable signal condition threshold to be used by the UE to determine that one or more signal parameters associated with at least one antenna element of the plurality of antenna elements satisfy a signal condition.

17. The method of claim 15, wherein receiving the communication comprises receiving the communication at a maximum power level corresponding to a saturated power of a linear region of a performance characteristic of a power amplifier of a plurality of power amplifiers, wherein each of the plurality of power amplifiers is independently used with an antenna element of the activated set of antenna elements.

18. The method of claim 17, further comprising transmitting a beam correspondence threshold to be used by the UE to determine a beam correspondence state.

19. The method of claim 15, further comprising receiving, based at least in part on a deactivated set of antenna elements of the plurality of antenna elements, an indication of a number of reference signals to be used for at least one of beam training, beam refinement, or beam failure recovery, wherein transmitting the one or more reference signals comprises transmitting the one or more reference signals based at least in part on the indication of the number of reference signals.

20. The method of claim 19, wherein the number of reference signals to be used for at least one of beam training, beam refinement, or beam failure recovery is based at least in part on a function of at least one of:
   a count of deactivated antenna elements of a deactivated set of antenna elements of the plurality of antenna elements, or
   a characteristic associated with a signal condition.

21. A user equipment (UE) for wireless communication, comprising:
   one or more memories; and
   one or more processors, coupled to the one or more memories, configured to:
      deactivate a set of antenna elements of a plurality of antenna elements based at least in part on a blockage condition associated with at least one antenna element of the plurality of antenna elements, wherein the set of antenna elements includes the at least one antenna element;
      identify a signal phase associated with an activated set antenna elements of the plurality of antenna elements; and
      transmit a communication based at least in part on the signal phase and using an equal power level for each antenna element of the activated set of antenna elements.

22. The UE of claim 21, wherein the one or more processors, to determine the blockage condition, are configured to determine that one or more signal parameters associated with the at least one antenna element satisfy a signal condition.

23. The UE of claim 22, wherein the one or more processors are further configured to:
   determine a set of signal gain measurements associated with respective antenna elements of the plurality of antenna elements; and
   determine that the one or more signal parameters satisfy the signal condition based at least in part on the determination of the set of signal gain measurements.

24. The UE of claim 21, wherein the one or more processors are further configured to control the signal phase using the set of activated antenna elements to mitigate the blockage condition.

25. The UE of claim 21, wherein the one or more processors are further configured to transmit, based at least in part on deactivating the set of antenna elements, an indication of a number of reference signals to be used for at least one of beam training, beam refinement, or beam failure recovery based at least in part on a determination of the blockage condition.

26. A network entity for wireless communication, comprising:
   a memory; and
   one or more processors, coupled to the memory, configured to:
      transmit one or more reference signals to a user equipment (UE) to be used by the UE for beam training associated with an activated set of antenna elements of a plurality of antenna elements;
      receive beam training feedback associated with the activated set of antenna elements; and
      receive a communication at an equal power level for each antenna element of the activated set of antenna elements of the plurality of antenna elements, wherein a signal phase is based at least in part on the set of activated antenna elements.

27. The network entity of claim 26, wherein the one or more processors are further configured to transmit an indication of a configurable signal condition threshold to be used by the UE to determine that one or more signal parameters associated with at least one antenna element of the plurality of antenna elements satisfy a signal condition.

28. The UE of claim 21, wherein the equal power level comprises a maximum power level corresponding to a saturated power of a linear region of a performance characteristic of a power amplifier of a plurality of power amplifiers, wherein each power amplifier of the plurality of power amplifiers is independently used with an antenna element of the activated set of antenna elements.

29. The UE of claim 21, wherein the one or more processors are further configured to:
   determine that a count of deactivated antenna elements of the set of antenna elements satisfies a beam correspondence threshold; and
   determine a beam correspondence state based at least in part on the determination that the count of deactivated antenna elements satisfies the beam correspondence threshold.

30. The UE of claim 29, wherein the one or more processors are further configured to determine the beam correspondence threshold.

* * * * *